United States Patent Office 2,970,159
Patented Jan. 31, 1961

2,970,159
HYDRAZINE DERIVATIVES

Hugo Gutmann, Birsfelden, Otto Straub, Bottmingen, and Paul Zeller, Neuallschwil, Switzerland, assignors to Hoffmann-La Roche Inc., Nutley, N.J., a corporation of New Jersey No Drawing. Filed June 30, 1958, Ser. No. 745,278

Claims priority, application Switzerland July 3, 1957

4 Claims. (Cl. 260—404.5)

This invention relates to novel substituted acid hydrazides of the general formula $$R_1\text{—CO—NH—NH—}R_2 \qquad I$$

wherein $R_1$—CO represents the palmitoyl, stearoyl or linoleoyl radical and $R_2$ is the iso-propyl or benzyl radical, and to the salts thereof.

The compounds of Formula I may be synthesized by several methods. The preferred method, which constitutes a particular feature of this invention, comprises condensing an acid of the general formula $$R_1\text{—COOH} \qquad II$$

with a substituted hydrazine of the general formula $$H_2N\text{—NH—}R_2 \qquad III$$

$R_1$ and $R_2$ in Formulae II and III having the same meaning as in Formula I, in the presence of an N,N'-disubstituted carbodiimide and, if desired, converting the condensation product into a salt.

According to this process, an acid of Formula II or its salts, e.g. the alkali metal salts, are condensed with a substituted hydrazine of Formula III in the presence of a carbodiimide, without preliminary conversion of this acid or its salts into more reactive compounds, such as the esters, halides, anhydrides, amides, and the like. The N,N'-disubstituted carbodiimides used as condensing agents may be obtained, e.g. by treating disubstituted urea derivatives with p-toluene-sulfonyl chloride in pyridine. The corresponding urea derivatives are recovered after the condensation. If suitably substituted carbodiimides are used, e.g. N,N'-dicyclohexyl carbodiimide, urea derivatives are obtained as by-products which may easily be separated from the reaction product. The reaction may e.g. be carried out at a temperature between 0 and 50° C., preferably at room temperature or at a temperature slightly above room temperature. Advantageously, a solvent is used for the reaction. Solvents which may be used for this purpose include organic solvents, e.g. methylene chloride, chloroform, dioxane, tetrahydrofuran, dimethylformamide or acetonitrile, as well as water.

The compounds of this invention may also be produced by condensing a reactive functional derivative of an acid of the above Formula II, such as e.g. an ester, halide, anhydride or amide thereof, with a substituted hydrazine of the above Formula III. The condensation is preferably effected by heating together the reaction components.

A further method for the preparation of the novel substituted acid hydrazides consists in heating a salt formed from an acid of the above Formula II and a substituted hydrazine of the above Formula III.

Another method of preparing the products of the invention consists in reacting the hydrazide of an acid of the above Formula II with a carbonyl compound and reducing simultaneously or subsequently the resulting hydrazone of the carbonyl compound. The reduction may be carried out by catalytic hydrogenation in an inert solvent and in the presence of catalysts, such as platinum, palladium-on-charcoal, and the like, or by reaction with lithium aluminium hydride. A modification of this method consists in treating the hydrazone formed with a Grignard compound, preferably methyl- or ethyl-magnesium halide, and hydrolyzing the product thus formed. Carbonyl compounds which may be used in this method include, e.g., acetone and benzaldehyde.

The substituted acid hydrazides obtained according to the processes of this invention form well-defined salts with inorganic acids, for example with hydrohalic acids, such as hydrochloric acid, hydrobromic acid and hydriodic acid; with other mineral acids, such as sulphuric acid, phosphoric acid and nitric acid; as well as with organic acids, such as tartaric acid, citric acid, camphorsulphonic acid, ethanesulphonic acid, salicylic acid, ascorbic acid, maleic acid, mandelic acid, and the like. Preferred salts are the hydrohalides, especially the hydrochlorides. The acid addition salts are conveniently prepared by reacting the substituted acid hydrazide with an excess of the appropriate acid, preferably in an inert solvent.

The compounds of this invention are monoamine oxidase inhibitors, that is, they inhibit the activity of monoamine oxidase which effects the deactivation of physiological regulators such as serotonin, tryptamine, epinephrine, etc., and stimulate the central nervous system. They are useful in psychotherapy for relief of disturbed or depressed states. They are also useful for increasing weight in cases where cachexia is present. The free hydrazine compound or a medicinally acceptable acid addition salt thereof may be administered orally or parentally in conventional solid or liquid dosage forms such as tablets, capsules, injectables, etc., comprising therapeutic doses incorporated in a conventional solid or liquid vehicle with or without excipients.

In the following examples, all temperatures are indicated in degrees centigrade.

EXAMPLE 1

*1-linoleoyl-2-iso-propyl-hydrazine*

20 g. of linoleic acid and 5.4 g. of isopropylhydrazine were dissolved in 100 ml. of dry methylene chloride, and the solution was stirred for several hours at room temperature with 14.7 g. of N,N'-dicyclohexyl carbodiimide. After filtering off the precipitated dicyclohexyl urea the methylene chloride solution was concentrated in vacuo, the residue was taken up in ether, and traces of residual linoleic acid were extracted by shaking with a saturated sodium bicarbonate solution. The crude condensation product was purified by distillation in a high vacuum. 1-linoleoyl-2-iso-propyl-hydrazine was obtained in the form of a yellowish oil as the main fraction at 170°/0.005 mm. Hg. The oil solidified at about 0°.

EXAMPLE 2

*1-palmitoyl-2-iso-propyl-hydrazine*

10 g. of palmitic acid hydrazide (M.P. 110°; obtained from methyl palmitate by heating in alcoholic solution with a slight excess of hydrazine hydrate over the equivalent amount) were suspended in 100 ml. of alcohol. After the addition of acetone and platinum catalyst the suspension was hydrogenated at room temperature and atmospheric pressure. After the theoretical amount of hydrogen had been absorbed the catalyst was removed from the reaction mixture, and the solution was concentrated to dryness. The 1-palmitoyl-2-iso-propyl-hydrazine isolated in this manner melted at 82–83° after recrystallization from alcohol.

1-palmitoyl-2-benzyl-hydrazine 1-palmitoyl-2-benzyl-hydrazine of M.P. 74–75° was obtained in a similar manner by carrying out the hydrogenation of the palmitic acid hydrazide in the presence of benzaldehyde instead of acetone.

EXAMPLE 3

1-stearoyl-2-iso-propyl-hydrazine 60 g. of stearic acid were heated for 5 hours with 100 ml. of methanol and 2 ml. of sulphuric acid. There were thus obtained 63 g. of methyl stearate of B.P. 115–118°/0.05 mm. Hg. 57.2 g. of this ester were boiled with 11.5 g. of hydrazine hydrate in 100 ml. of alcohol. The resulting stearic acid hydrazide was recrystallised from alcohol; M.P. 112°. This hydrazide was boiled with acetone to form 1-stearoyl-2-iso-propylidene-hydrazine, M.P. 57–58°, which was hydrogenated at room temperature and atmospheric pressure in alcoholic solution in the presence of platinum catalyst. After removal of the catalyst by filtration, concentration of the filtrate and recrystallisation of the residue from alcohol there was obtained 1-stearoyl-2-iso-propyl-hydrazine of M.P. 85–86°.

EXAMPLE 4

1-palmitoyl-2-iso-propyl-hydrazine 6.6 g. of methyl palmitate were heated for 62 hours at 120° with 9.5 g. of iso-propyl-hydrazine. Methanol was then added to the melt while it was still warm, and the mixture was cooled. The precipitate separating on cooling was filtered off by suction and recrystallised from methanol to obtain pure 1-palmitoyl-2-iso-propyl-hydrazine of M.P. 82–83°.

We claim:

1. A compound selected from the group consisting of hydrazines having the formula $$R_1\text{---}CO\text{---}NH\text{---}NH\text{---}R_2$$

wherein $R_1$—CO represents a radical selected from the group consisting of linoleoyl, palmitoyl and stearoyl, and $R_2$ represents a member selected from the group consisting of isopropyl and benzyl, and medicinally acceptable acid addition salts thereof.

2. 1-palmitoyl-2-iso-propyl-hydrazine.
3. 1-palmitoyl-2-benzyl-hydrazine.
4. 1-linoleoyl-2-iso-propyl-hydrazine.

References Cited in the file of this patent

Ralston: Fatty Acids and Their Derivatives, page 309 (1948).

Karrer: Organic Chemistry, 4th English edition, page 136 (1950).

Sheehan et al.: J. Org. Chem., vol. 21 (1956), pp. 439–441.